(12) United States Patent
Kimerling et al.

(10) Patent No.: US 8,619,358 B2
(45) Date of Patent: Dec. 31, 2013

(54) ELECTRICALLY PUMPED EXTRINSIC SEMICONDUCTOR OPTICAL AMPLIFIER WITH SLOT WAVEGUIDE

(75) Inventors: Lionel C. Kimerling, Concord, MA (US); Harry Atwater, South Pasadena, CA (US); Mark L. Brongersma, Redwood City, CA (US); Luca Dal Negro, Cambridge, MA (US); Thomas L Koch, Califon, NJ (US); Philippe Fauchet, Pittsford, NY (US); Michal Lipson, Ithaca, NY (US); Jurgen Michel, Arlington, MA (US); Carlos Angulo Barrios, Madrid (ES)

(73) Assignees: Massachusetts Institute of Technology, Cambridge, MA (US); California Institute of Technology, Pasadena, CA (US); The Board of Trustees of the Leland Stanford Junior University, Palo Alto, CA (US); University of Rochester, Rochester, NY (US); Cornell University, Ithaca, NY (US)

( * ) Notice: Subject to any disclaimer, the term of this patent is extended or adjusted under 35 U.S.C. 154(b) by 440 days.

(21) Appl. No.: 12/611,435

(22) Filed: Nov. 3, 2009

(65) Prior Publication Data
US 2010/0091358 A1      Apr. 15, 2010

Related U.S. Application Data

(63) Continuation of application No. 11/750,596, filed on May 18, 2007, now abandoned.

(60) Provisional application No. 60/801,444, filed on May 18, 2006.

(51) Int. Cl.
*H01S 5/00* (2006.01)

(52) U.S. Cl.
USPC .............................. 359/344; 438/31

(58) Field of Classification Search
USPC .................... 359/343, 344; 438/31
See application file for complete search history.

(56) References Cited

U.S. PATENT DOCUMENTS

| 5,107,538 | A | 4/1992 | Benton et al. |
| 6,154,475 | A | 11/2000 | Soref et al. |
| 6,828,598 | B1 * | 12/2004 | Coffa et al. .................. 257/102 |
| 2002/0048289 | A1 * | 4/2002 | Atanackovic et al. .......... 372/20 |
| 2004/0106285 | A1 | 6/2004 | Zacharias |
| 2004/0252738 | A1 | 12/2004 | Hill |

OTHER PUBLICATIONS

Barrios et al. "Electrically driven silicon resonant light emitting device based on slot-waveguide", Optics Express, vol. 13, issue 25, pp. 10092-10101 (Nov. 2005).*
Barrios et al., "Electrically driven silicon resonant light emitting device based on slot-waveguide" Optics Express, Optical Society of America, Washington, D.C., vol. 13, No. 25, Dec. 12, 2005, pp. 10092-10101.
Almeida et al., "Guiding and confining light in void nanostructure", Jun. 1, 2004, vol. 29, No. 11, Optics Letters, pp. 1209-1211.

* cited by examiner

*Primary Examiner* — Eric Bolda
(74) *Attorney, Agent, or Firm* — Gesmer Updegrove LLP

(57) ABSTRACT

An optical amplifier on a silicon platform includes a first doped device layer and a second doped device layer. A gain medium is positioned between the first and second doped device layers. The gain medium comprises extrinsic gain materials so as to substantially confine in the gain medium a light signal and allow the optical amplifier to be electrically or optically pumped.

14 Claims, 10 Drawing Sheets

| | P-SiO$_2$:Si-nc,Er* | Si$_3$N$_4$:Si-nc,Er* | PbSe or PbS quantum dots | Ge | III-V comparison: InGaAsP** |
|---|---|---|---|---|---|
| Gain Media | extrinsic | extrinsic | extrinsic | intrinsic | intrinsic |
| Injection Mechanism | tunnel | tunnel or band | tunnel | band | Band |
| Confinement Structure | slot | slot or volume | Slot | volume | Volume |
| Resonator | ring | ring | ring or straight | straight | Straight |
| Threshold Current $I_{th}$ | 10 μA | 12 μA | 0.1 mA | 2.6 mA | 0.92 mA |
| Threshold Current Density $J_{th}$(kA/cm$^2$) | $2\times10^{-3}$ | $2.4\times10^{-3}$ | 0.07 | 3.3 | 1.15 |
| Differential Quantum Efficiency $\eta_d$ | 0.15 | 0.05 | 0.5 | 0.15 | 0.23 |
| Output Power P(at I=50mA) | 70 μW | 28 μW | ~10 mW | 5.5 mW | 9 mW |
| Laser length & width (μm$^2$) | $2\pi(50)\times1.5$ | $2\pi(50)\times1.5$ | $2\pi(16)\times1.5$ | $80\times1$ | $80\times1$ |
| Film Thickness (nm) | 5 slots ×20=100 | 100 | 100 | 200 | 200 |
| External Quality Factor $Q_e$ | $2\times10^5$ | $2\times10^5$ | $1\times10^3$ | $2.5\times10^3$ | $2.5\times10^3$ |
| Optical Confinement | 0.3 | 0.3 | 0.3 | 0.6 | 0.6 |
| Free Carrier Abs. (cm$^{-1}$) | ~0 | ~0 | ~0 | 340 | ~10 |
| Propagation Loss (dB/cm) | 0.3 | 0.3 | 5 | 5 | 5 |
| Light-Emitter Conc. | $7.5\times10^{20}$(Er) | $2\times10^{20}$(Er) | $1\times10^{19}$ | – | – |
| Si-nanocrystal Conc. | $1\times10^{20}$ | $1\times10^{20}$ | – | – | – |
| ErUpconversion Coefficient $C_{24}$(cm$^3$/s) | $2.5\times10^{-18}$ | $2.5\times10^{-18}$ | – | – | – |
| Spontaneous Emission Lifetime $\tau_r$ | 8 ms | 1 ms | 1.7 μs | 3.3 ns | 5 ns |

FIG. 2

ELECTRICALLY PUMPED EXTRINSIC SEMICONDUCTOR OPTICAL AMPLIFIER WITH SLOT WAVEGUIDE

PRIORITY INFORMATION

This application is a continuation of U.S. Utility application Ser. No. 11/750,596, filed on May 18, 2007, which claims priority to U.S. Provisional Application Ser. No. 60/801,444, filed on May 18, 2006; both applications are incorporated herein by reference in their entireties.

GOVERNMENT SPONSORSHIP

This invention was made with government support under Grant No. FA9550-06-1-0470 awarded by the U.S. Air Force. The U.S. government has certain rights to this invention.

BACKGROUND OF THE INVENTION

The invention relates to the field of Si lasers, and in particular to a laser structure obtaining efficient light emission at around 1550 nm from the direct band gap of Ge.

An efficient laser source on Si is the most crucial device to achieve optoelectronic integrated circuit (OEIC) on Si. Although research on this field has been continued for over two decades, no efficient electrically pumped laser has been demonstrated on Si yet. Therefore, it is of great significance to achieve an efficient, electrically pumped light source on Si platform. Further more, it would be ideal if the light source emits at a wavelength around 1550 nm so that the on-chip optical signals are compatible with silicon waveguides, germanium detectors and the broadband gain spectrum of Er-doped dielectrics and, additionally, can be easily interfaced with the existing optical fiber communications infrastructure.

SUMMARY OF THE INVENTION

According to one aspect of the invention, there is provided an optical amplifier on a silicon platform. The optical amplifier includes a first doped device layer and a second doped device layer. A gain medium is positioned between the first and second doped device layers. The gain medium comprises extrinsic gain materials so as to substantially confine in the gain medium a light signal and allow the optical amplifier to be electrically or optically pumped.

According to another aspect of the invention, there is provided a method of performing optical amplification of a light signal on a silicon platform. The method includes positioning a first doped device layer and positioning a second doped device layer. Also, the method includes exposing the light signal to a gain medium positioned between the first and second doped device layers. The gain medium comprises extrinsic gain materials so as to substantially confine in the gain medium a light signal and allow the optical amplifier to be electrically or optically pumped.

According to another aspect of the invention, there is provided a method of forming an optical amplifier on a silicon platform. The method includes forming a first doped device layer and forming a second doped device layer. Also, the method includes forming a gain medium positioned between the first and second doped device layers. The gain medium comprises extrinsic gain materials so as to substantially confine in the gain medium a light signal and allow the optical amplifier to be electrically or optically pumped.

BRIEF DESCRIPTION OF THE DRAWINGS

FIG. 2 is a table illustrating various properties of various extrinsic gain materials;

DETAILED DESCRIPTION OF THE INVENTION

The invention provides a design for a laser or optical amplification device. The device utilizes a slot waveguide configuration which allows substantial confinement of the optical field within a low-index gain medium when suitable polarization is propagating in the waveguide. The same slot waveguide design allows electrical current to be transported through an insulating gain medium, because its thickness supports a tunneling conduction mechanism. This property allows electronic pumping of the structure which is favorable to integration of the device with electronic circuits. Optical pumping remains an option with the design, as well. The most attractive gain medium is Er-doped dielectric glass that delivers a broad gain spectrum centered around the telecommunications standard wavelength of 1550 nm. The target application for this device is on chip amplification of WDM signals and for a multi-wavelength source for an optical power supply to supply the WDM channel wavelengths.

The inventive device can be pumped by either optical or electrical energy, but it is particularly significant that electrical current injection can be used. The gain medium is a material with a low effective refractive index comprised of a single composition, layers of materials of differing composition or structured mixtures of materials with, in each case, at least one of them being doped with a density of optically active species such as Er ions or semiconductor quantum confined entities.

The gain medium may also be a materials system comprising of an optically active host. For lasing to occur, a majority population of ground states in the medium is converted to excited states by a pump flux of photons or electrons. The device performance is measured as the ratio of the signal gain to the required pump power referenced to a common noise factor. Best performance is achieved if the optical mode of the signal to be amplified is confined to the excited state volume of the gain medium, and if the quantum efficiency of the pumping excitation process is near unity.

Figure 1A:
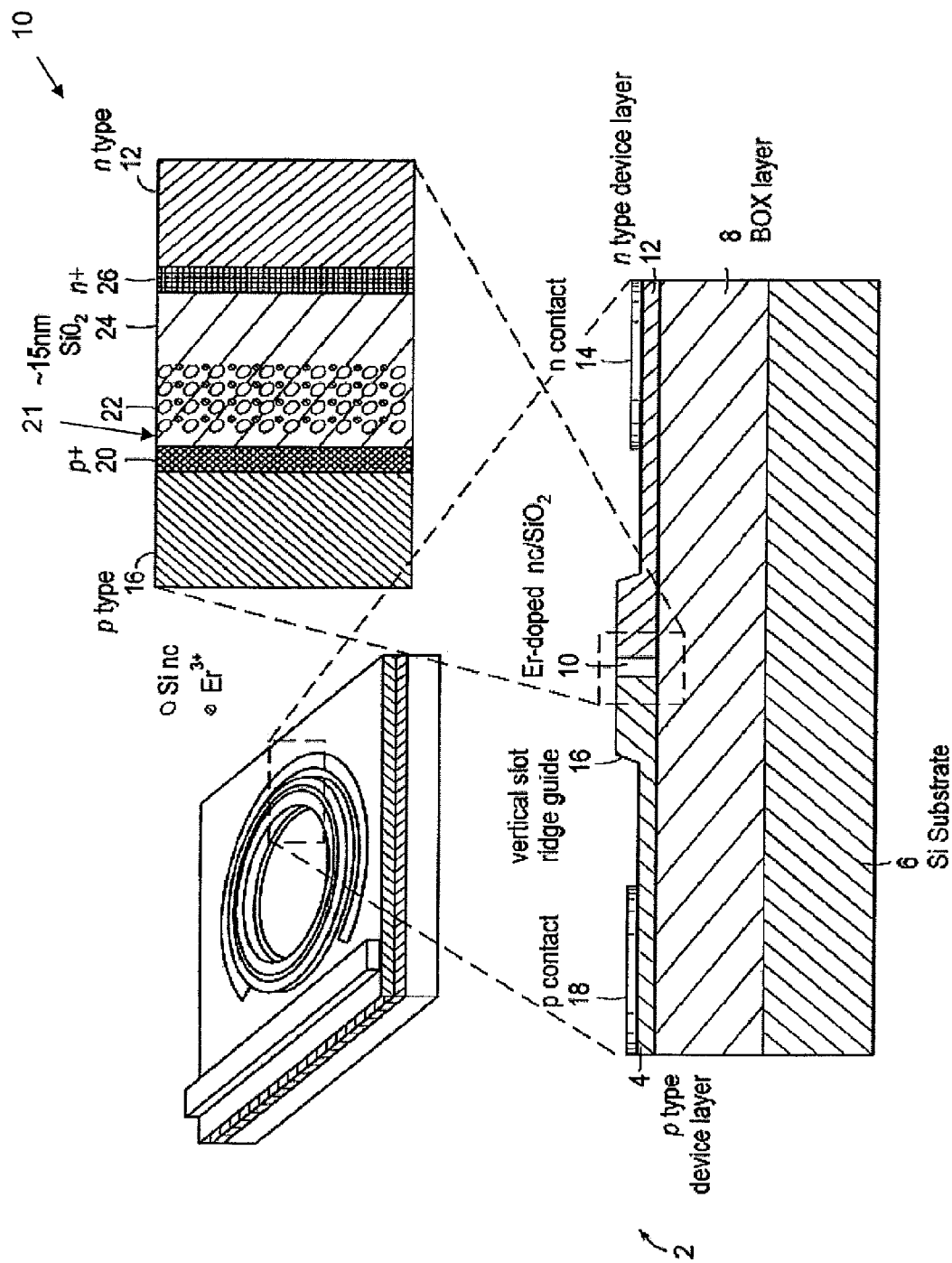
FIG. 1A is a schematic diagram illustrating a vertical slot confinement waveguide.
Figure 1B:
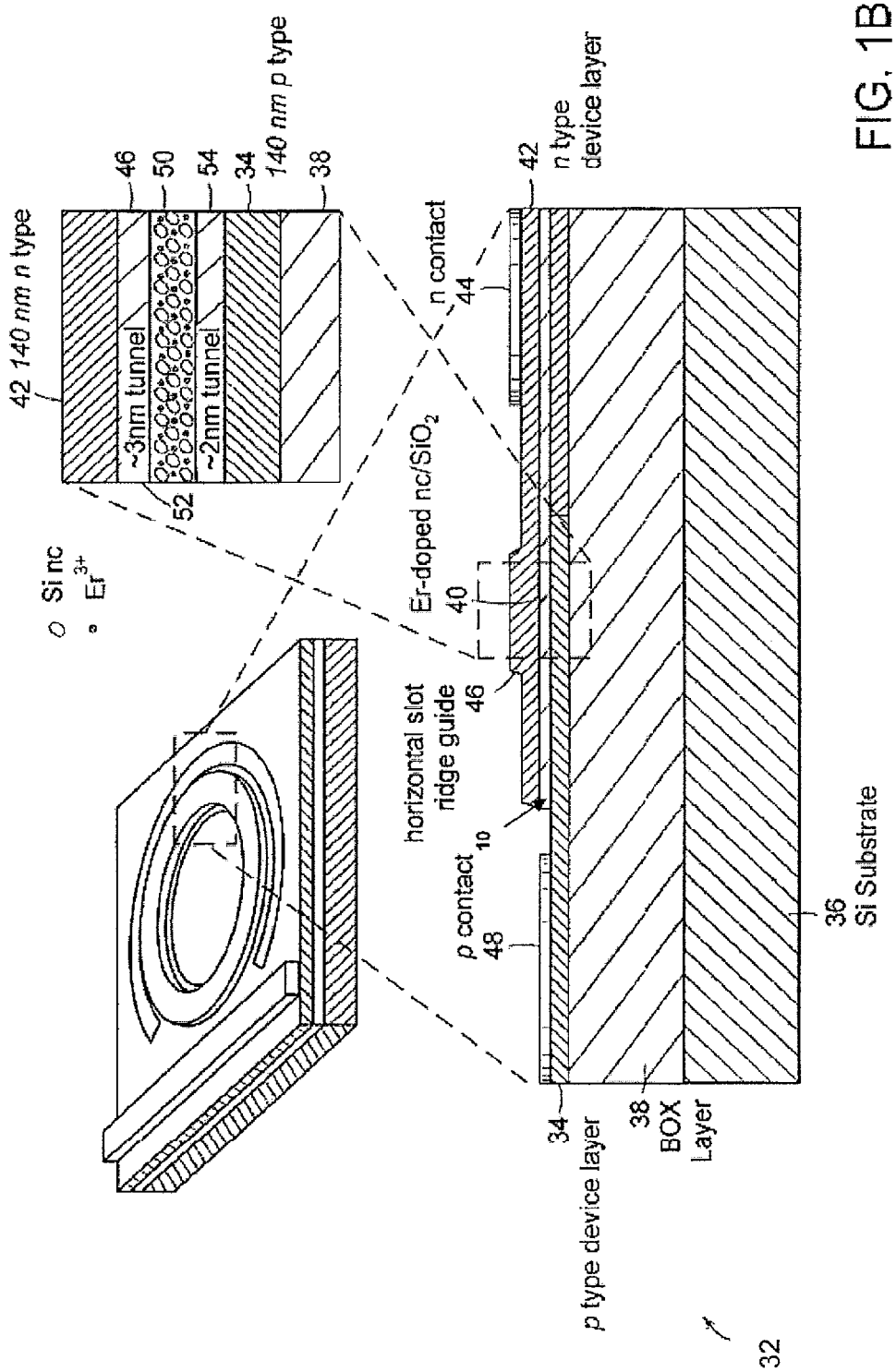
FIG. 1B is a schematic diagram illustrating a horizontal slot confinement.

FIG. 1A shows a ring resonator laser 2 having vertical slots and FIG. 1B shows a ring resonator laser 30 having a having horizontal slots with gain medium in the slot. In particular, FIG. 1A shows the ring resonator 2 having a p-type device layer 4 and n-type device layer 12. In a position between the p-type device layer 4 and n-type device layer 12 a gain medium region 10 is provided. The p-type device layer 4 and n-type device layer 12 are formed on a buried oxide layer 8. The buried oxide layer 8 is formed on a Si substrate 6. Also, a p-contact 18 and n-contact 14 are respectively positioned over the p-type device layer 4 and n-type device layer 12. In this embodiment, the gain material layer 52 includes Er-doped materials such Er-doped $SiO_2$. Other types of gain configurations such as index guided structures with Er-doped silicon nitride or quantum dot doped oxides can be used.

The gain medium region 10 includes a portion of a p+-type layer 20 and a first vertical slot 21 comprising $SiO_2$. A gain material layer 22 is positioned between the first vertical slot 21 and a second vertical slot 24. An n+-type layer is placed between the n-type device layer 12 and the second vertical slot 24.

FIG. 1B shows the ring resonator 32 having a p-type device layer 34 and n-type device layer 42. In a position between the p-type device layer 34 and n-type device layer 42 a gain medium region 10 is provided. The p-type device layer 34 and n-type device layer 42 are formed on a buried oxide layer 38. The buried oxide layer 38 is formed on a Si substrate 6. Also, a p-contact 48 and n-contact 44 are respectively positioned over the p-type device layer 34 and n-type device layer 42.

The gain medium region 40 includes a portion of doped layers 34 and 42 and the horizontal slot 50, 52 and 54. A gain material layer 52 is positioned between the first tunnel layer 50 and a second tunnel layer 54. The p-type device layer 34 is placed between the buried oxide layer 38 and the tunnel layer 54. In this embodiment, the gain material layer 52 includes Er-doped materials such Er-doped $SiO_2$. Other types of gain materials such as index guided structures with Er-doped silicon nitride or quantum dot doped oxides can be used.

Ultra-low loss waveguide structures that produce cavity factors $Q>10^5$, are desired. The gain medium is designed according to its electrical pump energy transfer, optical/materials interaction strength, optical materials losses, and density of light emitters. An electroluminescent material with light emission in the 1200-1700 nm wavelength range is desired.

The primary extrinsic dopant candidates are the $Er^{3+}$ ion and PbS/PbSe quantum dots. Erbium represents a conservative approach that leverages an extensive library of glass materials knowledge from the fiber optic telecommunications industry, and can further exploit the novel energy transfer properties of Si-nanocrystals (Si-nc) and Si-nanowires. The study of Si-nanocrystals and Si-nanowires has matured over the last five years into a critical mass of materials engineering knowledge. Nanostructured silicon oxide ($SiO_2$), phosphate ($P_2O_5$), and silicon nitride ($Si_3N_4$) glass dielectrics can promote the extrinsic dopant inversion through energy transfer processes. PbS/PbSe quantum dots are a high optical gain approach based on recent breakthroughs with considerable potential for integration into host materials compatible with a CMOS process flow.

FIG. 2 is table illustrating the extrinsic gain material efficiencies of PbS/PbSe quantum dots, Si-nanocrystals (Si-nc), $Si_3N_4$, dope-$SiO_2$ (P—$SiO_2$) in relations with intrinsic gain materials like Ge and InGaAsP.

Figure 3A:
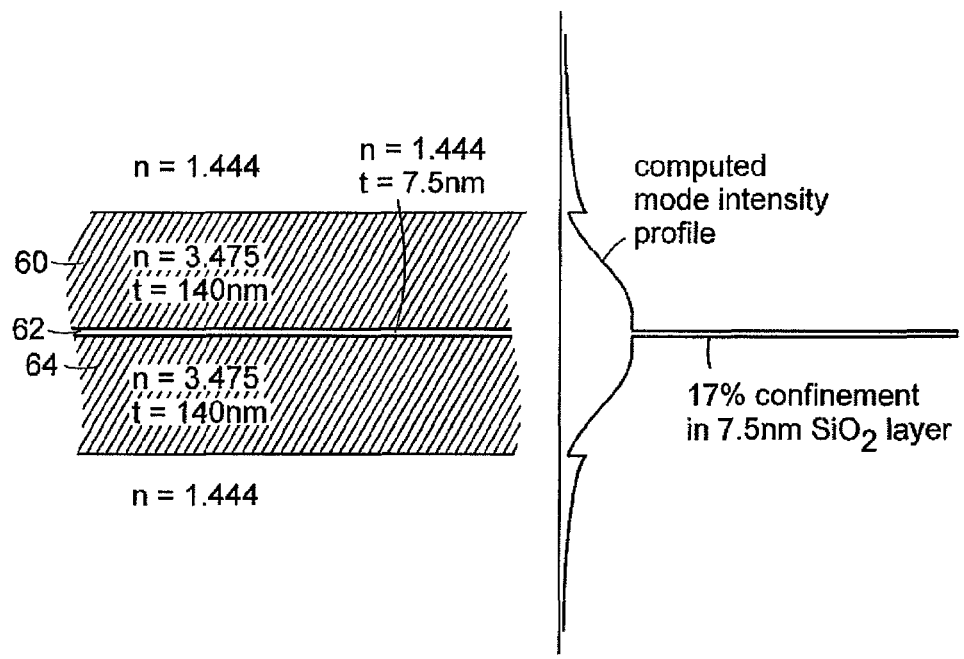
FIG. 3A is an electric field profile of a propagating mode of light with high confinement within a low refractive index slot layer.
Figure 3B:
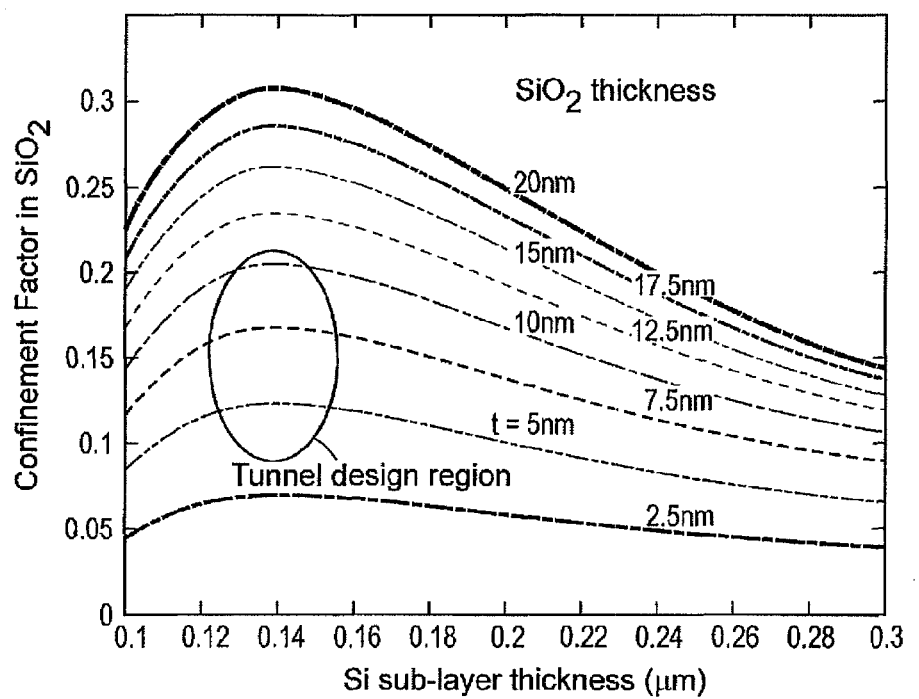
FIG. 3B is a graph illustrating slot confinement factor as a function of its surrounding Si sub-layer's thickness.

A remarkable feature of the Si 60/$SiO_2$ 62/Si 64 slot waveguide structure depicted in FIG. 3A is the high confinement factor achievable even in very thin low refractive index slot layers. For silicon dioxide filled slots, mode confinement factors from 0.1 to >0.3 are possible for oxide thickness in the 5-20 nm thickness range, as shown in FIG. 3B, which is the same range of oxide thicknesses employed in the field-effect electroluminescent devices. Even for dimensions of only 2.5 nm, the slot design provides for confinements in excess of ~7%. It is an advantageous feature of the inventive device that the thin slot layer simultaneously provides high optical confinement while being thin enough to allow for electrical tunnel injection into the slot gain medium.

Several slot laser cavity configurations, including the vertically-oriented slot 2, as illustrated by FIG. 1A and the horizontally-oriented slot 32 as depicted schematically in FIG. 1B can be used. A high confinement in the low-index slot region is achieved when the polarization of the optical field propagating in the guide has its magnetic field predominantly polarized in the plane parallel to the slot interfaces, and perpendicular to the direction of propagation. For the configuration shown in FIG. 1A, this would occur with the waveguide mode commonly referred to as the "Transverse Electric" (TE) mode, while in FIG. 1B this would occur with the waveguide mode commonly referred to as the "Transverse Magnetic" (TM) mode. Each structure has advantages and disadvantages related to fabrication: the vertical slot enables slot fabrication with ultra-low loss single crystal SOI waveguides but requires MOS device fabrication on the sidewall of the Si waveguide, requiring exceptional fabrication precision and potential high index contrast sidewall scattering loss.

The horizontal slot allows for planar CMOS processing but requires fabrication of a Si/$SiO_2$/Si/$SiO_2$/Si-substrate structure. The horizontal design provides high precision definition of the optically active slot layer without an etching process, ensuring low propagation loss. The major horizontal slot structure process design constraint is fabrication of an upper doped cladding layer/electrode of low propagation loss. An alternative process flow can employ wafer bonding and layer transfer to form the heterostructure. It is reasonable to expect fabrication of Si/$SiO_2$/Si/$SiO_2$/Si-substrate structures by bonding and transferring 140 nm Si layers onto commercially-obtained SOI structures. Alternative methods can include the use of low-loss, <2 dB/cm, amorphous, polysilicon or similarly silicon-compatible, doped upper layers.

Figure 4B:
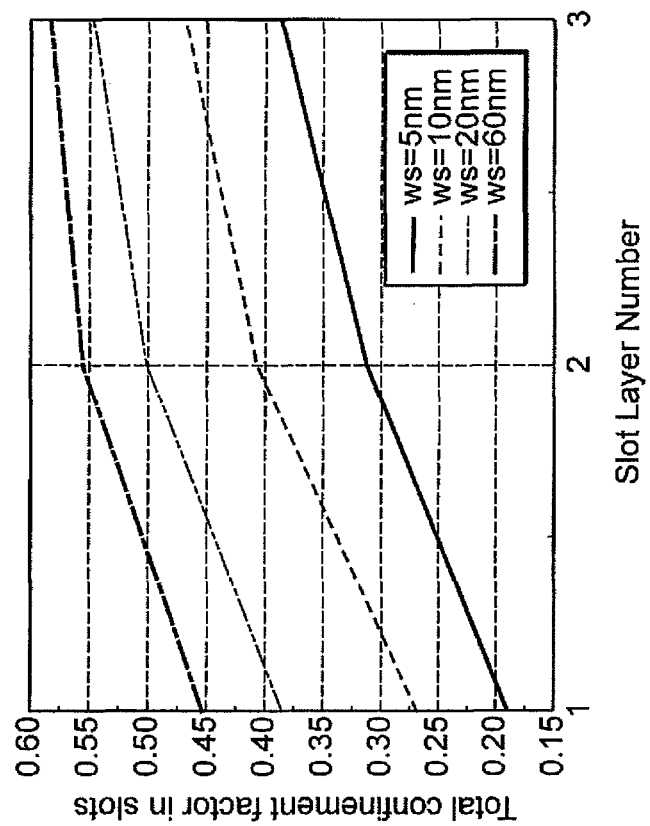
FIG. 4B is a graph demonstrating a multilayer design having increased optical confinement for the lasing wavelength.
Figure 4A:
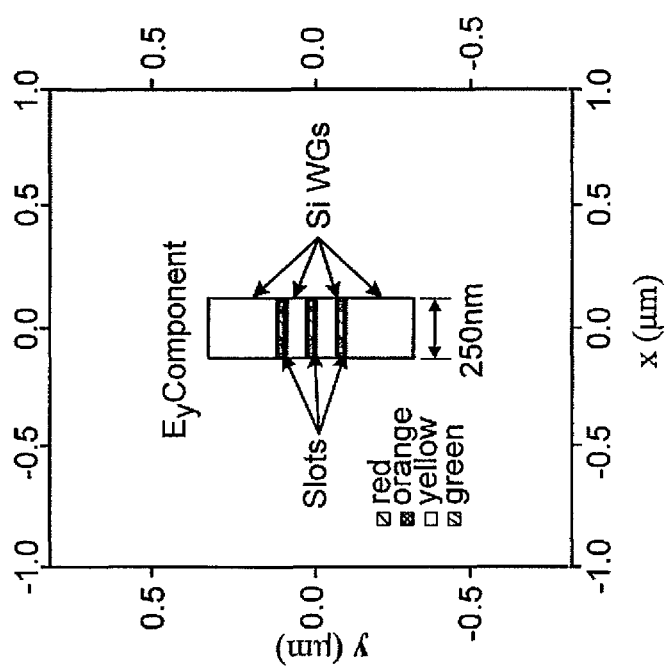
FIG. 4A is a graph demonstrating when a slot multilayer begins to primitively mimic the confinement properties of "air band" photonic crystal modes.

The high confinement factor of slot layers is a result of the high index contrast between the low index slot material and the adjacent high index guide layers. Multi-slot layer structures can be designed to further increase signal confinement in the low index gain medium. FIG. 4A shows the increased confinement factor, thus increased modal gain, achieved in such structures. FIG. 4B that shows with slots as small as 5 nm a confinement factor as high as 40% for a 250 nm wide waveguide composed of 3 low dielectric slots can be reached. Confinement can be further increased by design of larger width waveguides.

Results show high electrical injection efficiency into Si-rich $Si_3N_4$:Er, making this materials systems an ideal candidate for exploring the slot multilayer structure. Vertical and alternative lateral injection schemes can be used in Si-rich SiO$_2$/Si-rich Si$_3$N$_4$:Er multilayers slots in order to enhance Er population inversion. Er ions can be electrically sensitized by Si nanoclusters embedded within the Si-rich Si$_3$N$_4$ layer, Si-rich SiO$_2$ layer, or potential combination of both, thus enhancing pump efficiency. By changing the number of layers and by selective Er incorporation, optimization of critical parameters such as Er—Er interaction length, up conversion, and energy transfer efficiency can be optimized.

The efficient electrical excitation of Si-rich Si$_3$N$_4$:Er also opens the pathway to return to conventional index-guided confinement schemes with confinement factors close to 0.6 and minimal high-dielectric/low-dielectric interfaces to hinder potential scattering. The key to successful electrical injection into an index-guided waveguide is through the application of a transparent, at the laser wavelength, and conducting cladding. Such high transparency properties in sputtered Indium Tin Oxide have successfully been demonstrated.

The low IR emission cross section of $\sigma \sim 6 \times 10^{-21}$ cm$^2$ for Er in Si-rich oxides and Si-rich nitrides requires the design of high Quality Factor Q resonant cavities with Q>10$^5$. The evanescent coupling physics of ring resonators make such devices ideal cavities for such high Q applications. One can determine lasing criteria for the Er-doped oxide and nitride environments by standard methods; results are summarized in FIG. 2.

Both the already demonstrated vertical, and proposed horizontal, slot waveguides are readily made into resonator structures using either ring configurations or waveguides with embedded high-index-contrast slots or holes for Bragg reflection. The selection of these is determined by which provides best electrical access and lowest optical losses.

Si-nc sensitized Er in SiO$_2$ (SiO$_2$:Si-nc,Er), phosphorus-enriched SiO$_2$(P—SiO$_2$:Si-nc,Er), and Si$_3$N$_4$, can be used as gain media for the optically- or electrically-pumped Si slot laser, as discussed in FIGS. 1A-1B. Also, it has been shown that excitons can be efficiently excited by MOS field effect injection into Si-nanocrystals, thus enabling field effect LEDs to be realized in Si CMOS structures.

Recent measurements indicate the internal radiative quantum efficiency for excitons in Si-nc is high (60-100%). Si-nanocrystal-sensitized Er (Si-nc:Er) in SiO$_2$ has been extensively investigated and the following features are now well established, for example excitation of Si-nc and energy transfer between Si-nc and Er are faster than radiative emission rates for Er, enabling nc-Si:Er gain media to be inverted. Er can be incorporated at high concentration ($7.5 \times 10^{20}$ cm$^{-3}$)$^7$ in P-doped SiO$_2$. Thus, Si-nc:Er can deliver a gain/length as high as 20 dB/cm, despite a small emission cross section of $\sigma \sim 6 \times 10^{-21}$ cm$^2$. Rayleigh scattering calculations show scattering loss by the nm-scale nanocrystals to be negligible. Assuming a confinement factor of 0.26 in a 25 nm SiO$_2$ layer, one can obtain modal gain of 2.70 dB/cm.

An electrical excitation cross section of $\sigma_e = 10^{-14}$ cm$^2$ has been observed by electroluminescence measurement of Si-rich SiO$_2$:Er. The minimum Q factor to obtain lasing under electrical injection in a resonant cavity using Si-nanocrystals in oxide or nitride materials, assuming similar values for $\sigma_e$, as shown in FIG. 2.

Figure 5A:
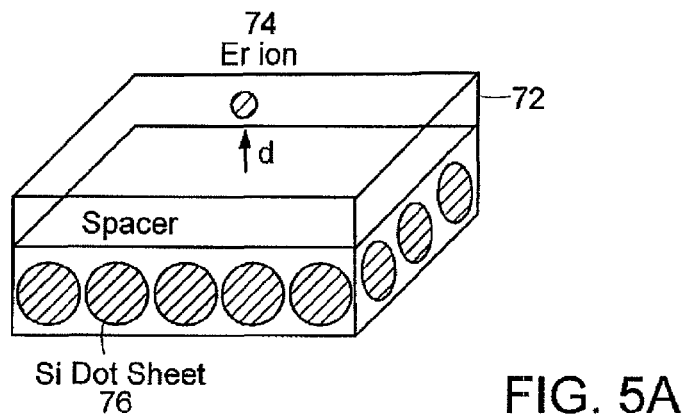
FIG. 5A is a schematic diagram of a Si quantum dot sheet with a thin oxide spacer layer that controls the distance between the sheet and an Er ion at the nm scale.
Figure 5B:
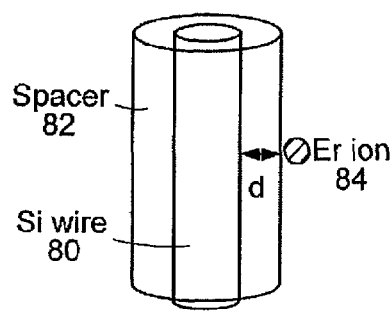
FIG. 5B is a schematic diagram of Si nanowire with an oxide shell of controlled thickness.
Figure 5C:
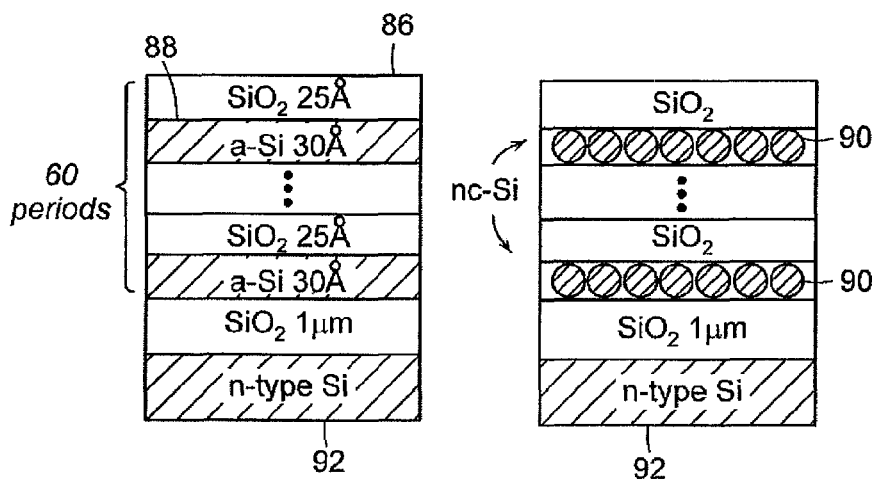
FIG. 5C is a schematic diagram of a superlattice structure made of a-Si and $SiO_2$ layers before and after annealing.

Nanoscale control of the Er to Si-nanostructure distance can influence Förster energy transfer from Si-nanostructure to Er. Deviation from typical dipole-dipole 1/r$^6$ interaction strength, due to thin sheet (2D) and wire configurations shown in FIGS. 5A-5C can be exploited to optimize wallplug efficiency for electrical injection. FIG. 5A is a schematic diagram of a Si quantum dot sheet 76 with a thin oxide spacer layer 72 that controls the distance between the sheet and an Er ion 74 at the nm scale. FIG. 5B is a schematic diagram of a Si nanowire with an oxide shell of controlled thickness. FIG. 5C shows a superlattice structure made of a Si 86 and SiO$_2$ 88 layers before and after annealing. Silicon nanocrystals 90 are formed if the thermal budget is chosen appropriately. The Si 86 and SiO$_2$ 88 layers are formed on a n-type Si layer 92.

Growing atomic-scale precision silicon sheets with controlled crystallinity, produce brick-like 10 nm-thick Si nanostructures with large aspect ratios that facilitate in-plane carrier transport and enhance suppression of energy backtransfer from the Er atom, due to quantum confinement out of the sheet-plane. Such nanostructures will facilitate in-plane electrical injection that relies on band conduction across the sheet and not tunneling through a dielectric. Bypassing Fowler-Nordheim tunneling is predicted to significantly enhance energy transfer to the Er atom.

Figure 6A:
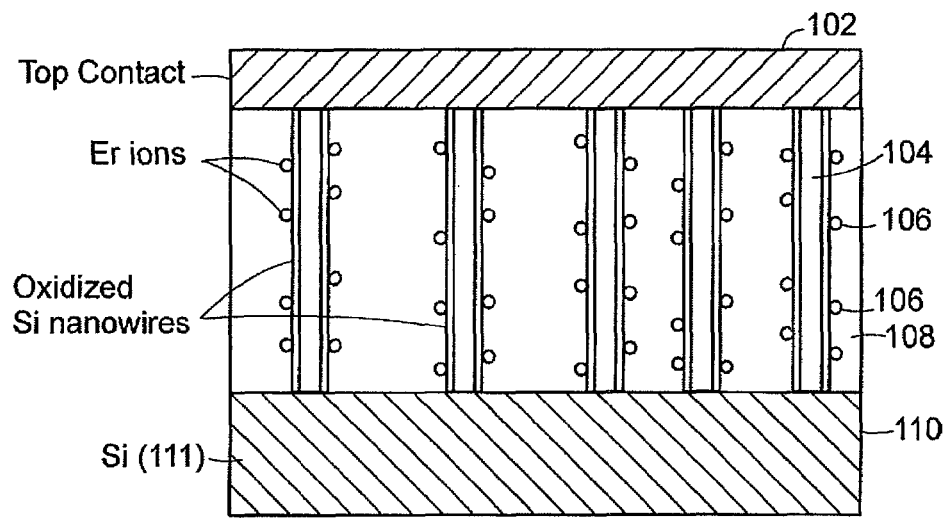
FIG. 6A is a schematic diagram of an electroluminescent device with a dense array of aligned Si nanowires.

FIG. 6A is a schematic diagram of an electroluminescent device 100 with a dense array of aligned Si nanowires 104. A carefully grown oxide shell 108 separates the Er ions 106 from the Si nanowires 104. The Si nanowires 104 are coupled to a top contact 102 and a Si substrate 110 at both of its ends. FIG. 6A is a scanning electron microscopy image of a random array of CVD grown Si nanowires with an average diameter of about 35 nm on a Si substrate.

Electrical injection can be achieved through surface contact with Si nanowires that embed within an SiO$_2$:Er or P—SiO$_2$:Er host matrix and transfer energy to Er. Long single crystal wires can be grown at low defect density and constant diameter with in situ doping during or post-growth to form p-n junctions. The synthesized nanostructures are surface-passivated by thermal oxidation, optimizing energy transfer to Er from bipolar band injection. High quality Si-nanowires with long 10-100 μs photoluminescence lifetimes can be grown by CVD and catalyzed by TiSi$_2$ particles.

Thin coatings of SiO$_2$:Er can be deposited onto the nanowires by spin coating, solution processing, and sputtering. By controlling a spacer layer by means of thermal oxidation, the structure can be optimally tuned between Si nanowire and Er atom density.

The optimization includes growth of nanowires using a number of CMOS-compatible catalyst particles directly out of a Si chip. The effects of surface passivation, oxidation, and annealing on the PL, should be optimized in the context of electronic transport, Förster energy transfer to Er, and obtaining efficient charge injection and electroluminescence from nanowires.

In order to ensure net gain and efficient lasing, a tight budget of permissible propagation losses within the proposed resonant cavity structures is required. Loss mechanisms common to slot and index guided confinement are scattering loss, radiative turning loss, and free carrier absorption or other host material absorption losses. A waveguide scattering loss of 0.4 dB/cm is assumed for these waveguide designs which can be achieved, for example, using state-of-the-art local-oxidation definition processes. Radiative losses are assumed <0.1 dB/cm for ring resonators with diameters >100 μm. Under electrical injection, it is imperative to ascertain the amount of steady state free carrier absorption, due to the forward/reverse biased injection of a tunnel or band current.

While free carrier loss in the slot confinement-based MOS structure can be minimized by use of lowly doped Si in the 10$^{16}$ cm$^{-3}$ dopant range, excess carriers will be present within an accumulation layer or inversion layer, used to drive tunnel injection. A sheet carrier density will form to support tunnel injection at a flux rate that matches the exciton recombination rate/area requisite to invert Er ions: $2 \times 10^{14}$ cm$^{-2}$s$^{-1}$. This injection rate corresponds to a current density of 32 mA/cm$^2$.

Field effect injection exhibits Fowler-Nordheim tunneling behavior; for a 3 nm tunnel oxide thickness, a sheet carrier density (<0.2V bias accumulation layer) of $8\times10^{11}$ cm$^{-2}$ is achieved.

It is conservatively assumed all of this sheet charge contributes to free carrier absorption, giving a free carrier absorption loss of 1.1 dB/cm. If one allows for a linear output coupling waveguide and assumes only 80% of the ring is Er-doped and electrically active, the average losses around ring are computed to be $\alpha_{av}=1.21$ dB/cm.

Starting from a 13 dB/cm achievable gain, a 3 nm tunnel oxide's confinement implies a modal gain of $g_{av}=2.70$ dB/cm; thus a net gain of 1.49 dB/cm can be achieved, which will enable lasing. It also suggests an upper limit on the differential quantum efficiency of ~53%, reduced of course by the internal efficiency of the injection process.

Free carrier absorption due to accumulation and inversion layers is the primary optical gain engineering parameter to design for when using slot confinement.

Figure 7A:
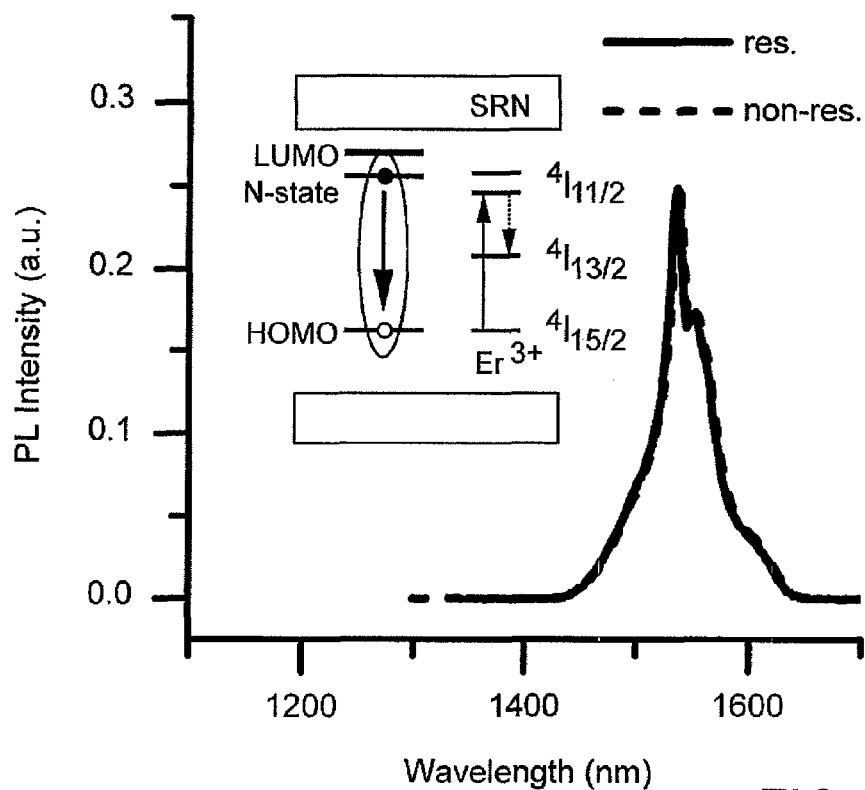
FIG. 7A is a graph illustrating room temperature photoluminescence of Si-rich $Si_3N_4$:Er system with resonant and non-resonant pumping.
Figure 7B:
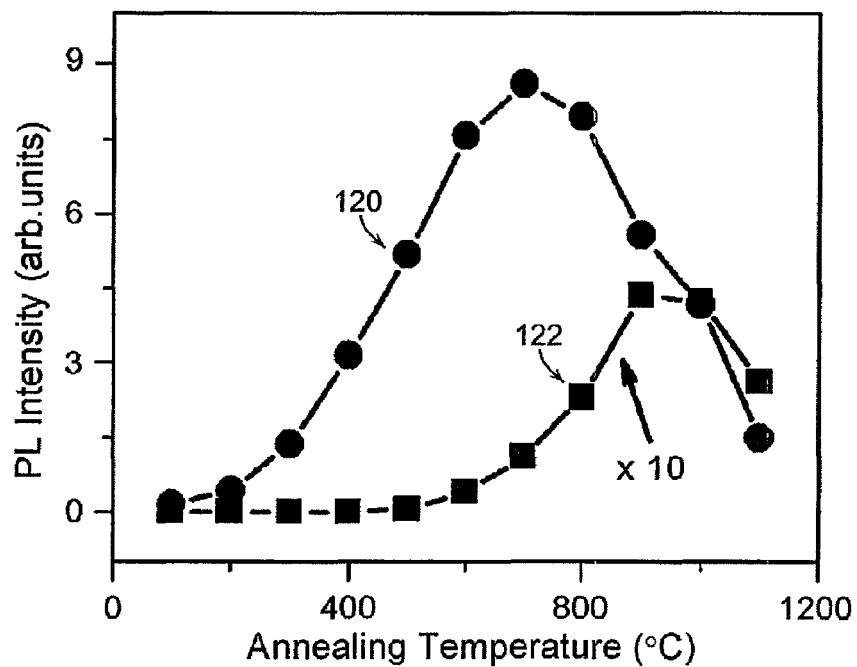
FIG. 7B is a graph illustrating room temperature Er emission versus annealing temperature for Si-rich $SiO_2$:Er samples.

Efficient Er energy sensitization is possible also in Si-rich $Si_3N_4$:Er systems. FIG. 7A shows a near-identical overlap of Er emission spectra obtained under resonant (488 nm) and non-resonant (457 nm) pump wavelength conditions, directly showing that Er excitation in Si-rich $Si_3N_4$:Er can be mediated through the dielectric host by means of an efficient energy transfer process.

Figure 6B:
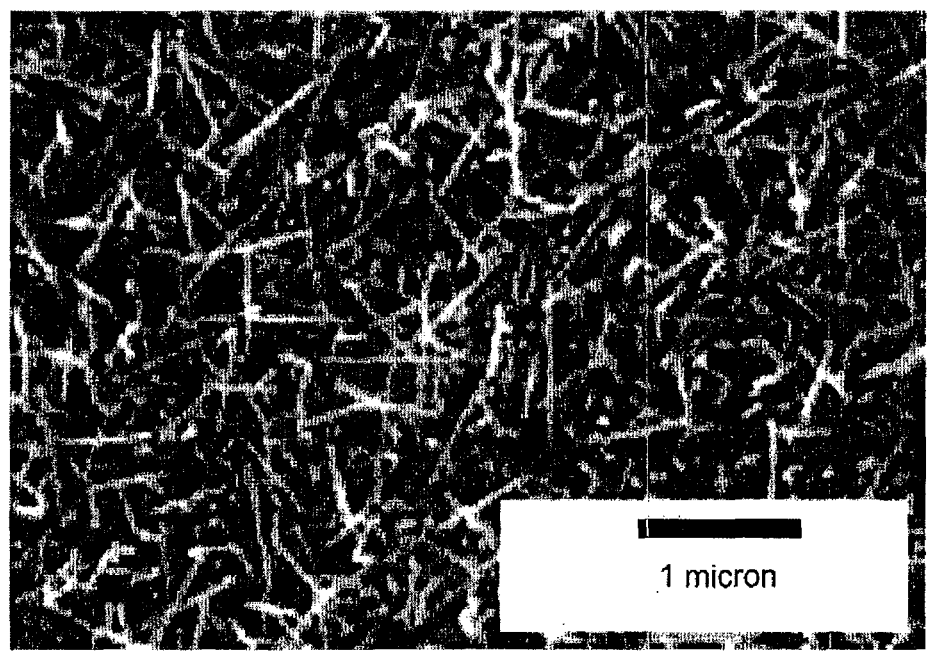
FIG. 6B is a schematic diagram of a Scanning Electron Microscopy image of a random array of CVD grown Si nanowires.

Er emission sensitization in Si-rich $SiO_2$:Er can be strongly enhanced through low temperature annealing [Luca ref]. For samples with 38 at % Si, as shown in graph 120 in FIG. 6B, the optimum annealing temperature range 600-800° C. yields an emission enhancement greater than 100× compared to $SiO_2$:Er samples annealed at the same temperatures, as shown in graph 122 in FIG. 6B. The enhanced sensitization is consistent with the driving force to form a higher density of smaller Si clusters at low annealing temperatures. This approach can be applied to Er-doped Si-rich nitrides to similarly optimize electrical sensitization (optimizing nanocrystal lifetime, passivation, density, crystallinity).

Figure 8A:
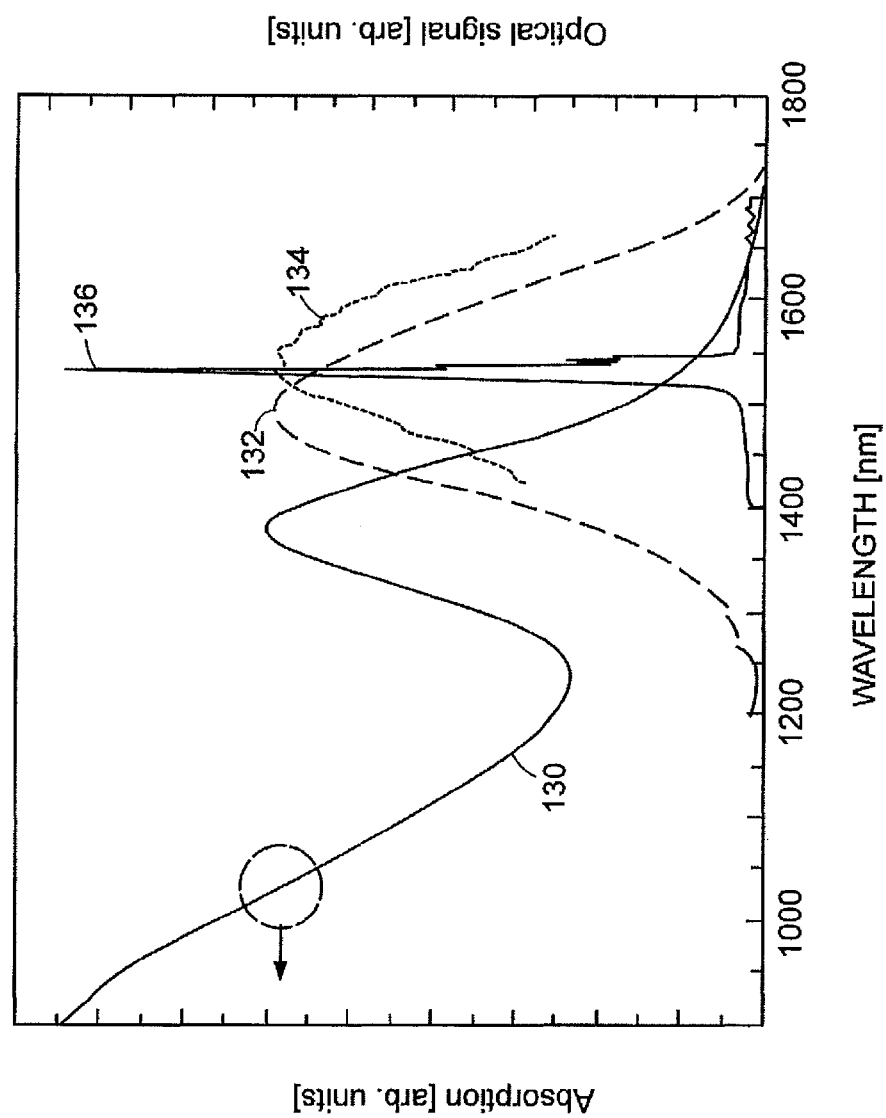
FIG. 8A is a graph demonstrating PbS quantum dots absorption spectra and photoluminescence spectra at room temperature, 80 K, and lasing wavelength.
Figure 8B:
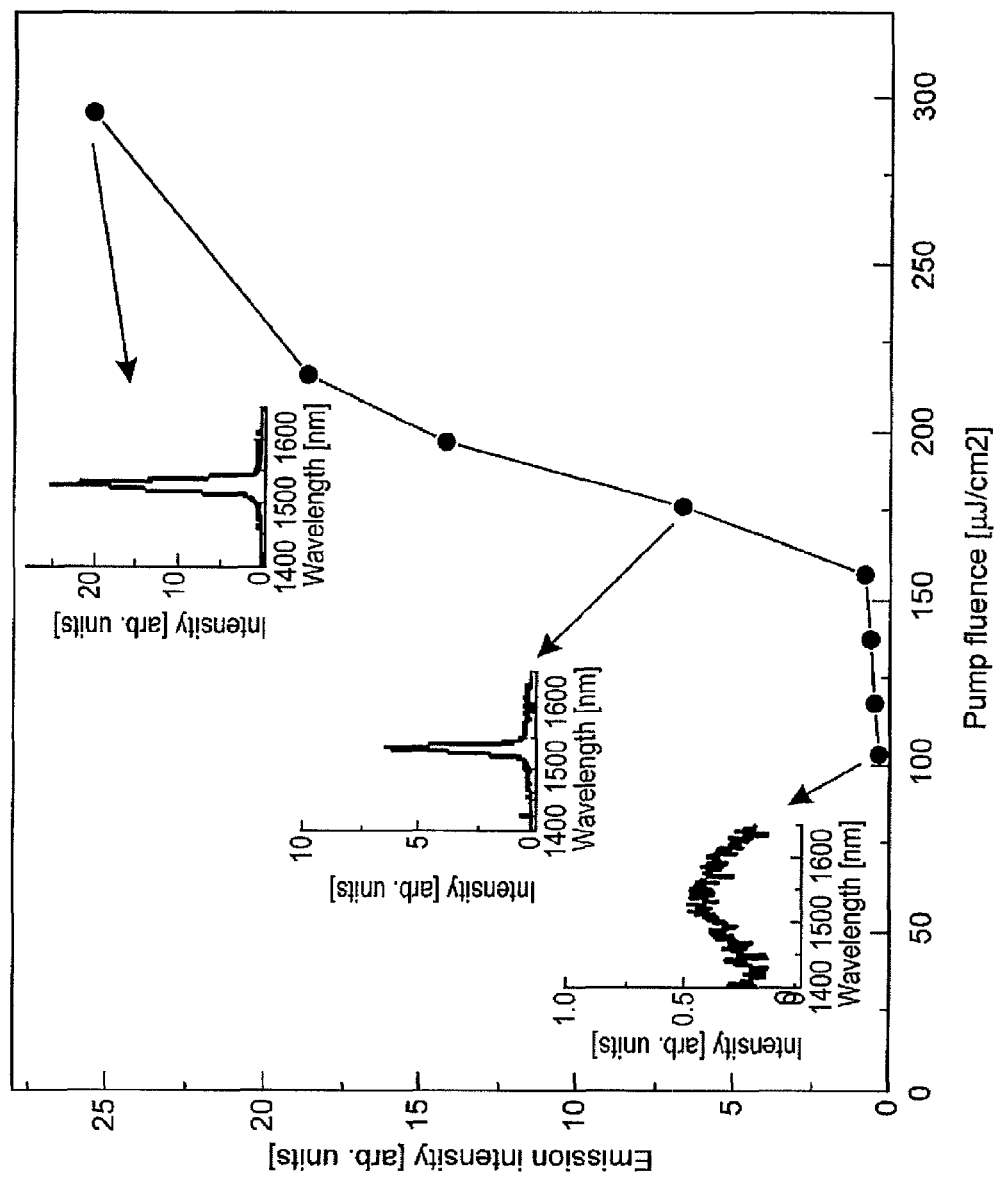
FIG. 8B is a graph demonstrating optically pumped lasing at a threshold pump fluence of 177 $\mu J/cm^2$.

FIG. 8A shows PbS quantum dot absorption spectra 130 and photoluminescence spectra at room temperature 132 and 80 K 134, and lasing wavelength 136. FIG. 8B shows optically pumped lasing at a threshold pump fluence of 177 $\mu J/cm^2$.

PbSe and PbS quantum dots produce radiative excitonic emission near 1550 nm, making them size-tunable extrinsic light emitters for designing light sources across a range of wavelengths. PbSe lifetimes have been predicted theoretically and observed experimentally in the 0.1-1 is range with high quantum efficiency (>50%). The key to successful integration in a solid CMOS-compatible host will be passivation; current solid hosts reduce internal recombination efficiency by 10×. High quantum efficiency in PbS quantum dots synthesized from sequential ion implantation into $SiO_2$ and annealed at 675° C. has been demonstrated.

Quantum dots with 3 nm radii have been observed with a room temperature lifetime of 1.7 µs, a value $10^3$× larger than II-VI nanocrystals like CdSe. An absorption cross section of $1.5\times10^{-14}$ cm$^2$ has been measured at 488 nm. The models for PbSe and PbS media predict a >50 dB/cm modal gain within a 25 nm slot confinement structure, by injection currents of ~20 mA/cm$^2$.

There are two methods for PbS electrical injection, that yield 1.53-1.56 µm emission: 1) optically pumped lasing from solution processed, passivated PbS quantum dots on Si; and 2) electroluminescence from the same.

The Si slot waveguide laser can employ a standard CMOS process flow using process tools and modules that can already be performed in any CMOS foundry for all fabrication steps. A gain medium fabrication pathway could employ ion implantation for delivery of Si-nc:Er, or PbSe/PbS, quantum dots into dielectric media. CMOS-compatible process flows would place PbSe/PbS monolithic integration at the endpoint of the CMOS process flow. Conductive Indium-Tin-Oxide (ITO) cladding can be introduced for transparent electrical contact to $Si_3N_4$:Er index confinement structures. ITO can be introduced by sputtering at the endpoint of a CMOS process flow.

The invention can be used in the formation an optical signal processor link, as well as optical amplifier and laser devices. The optical signal processor link can use the inventive waveguide structures described herein with modulators, waveguides and photodetectors that are on a silicon platform constituting an optical data link. The link can establish a capability for a high volume manufacturing transceiver platform and a platform for signal processing with the further integration of optical filters and switches.

A hidden advantage of the silicon optical source platform is the optical power supply. Light sources involve sophisticated electronic drivers, and both continuous and modulated signals are required for optical I/O and clock distribution, respectively. An optical power supply is a stand-alone chip that supplies these signals to a functional chip. The gain media have broadband emission and therefore multi-channel capability. Thus, allowing the invention to be used in such a platform.

Although the present invention has been shown and described with respect to several preferred embodiments thereof, various changes, omissions and additions to the form and detail thereof, may be made therein, without departing from the spirit and scope of the invention.

What is claimed is:

1. A method of performing optical amplification of a light signal on a silicon platform comprising:
   positioning a first doped device layer;
   positioning a second doped device layer; and
   exposing said light signal to a gain medium positioned between said first and second doped device layers, said gain medium comprising extrinsic gain materials so as to substantially confine in said gain medium said light signal and allow said optical amplifier to be electrically and optically pumped, said gain medium having a linear output coupling slot waveguide configuration that allows for substantial confinement of an optical field within said gain medium when suitable polarization of said optical field propagating in said linear output coupling slot waveguide has a magnetic field predominantly polarized in a plane parallel to a plurality of interfaces of said linear output coupling slot waveguide, said linear output coupling slot waveguide allows electrical current to be transported through said gain medium.

2. The method of claim 1, wherein said first doped layer comprises p-type or n-type materials.

3. The method of claim 1, wherein said second doped layer comprises p-type or n-type materials.

4. The method of claim 1, wherein said extrinsic gain materials comprise Er ions.

5. The method of claim 1, wherein said extrinsic gain materials comprise Er-doped silicon nitride.

6. The method of claim 1, wherein said extrinsic gain materials comprise quantum dots.

7. The method of claim 1, wherein said extrinsic gain materials comprise Er-doped silicon dioxide.

8. The method of claim 7, wherein said Er-doped silicon dioxide comprises Si nanocrystals-sensitized Er.

9. The method of claim 1, wherein said extrinsic gain materials comprise Si nanowires.

10. The method of claim 9, wherein said Si nanowires are coupled to Er ions.

11. The method of claim 6, wherein said quantum dots comprise PbS or PbSe quantum dots.

12. The method of claim 6, wherein said quantum dots comprise Si quantum dots.

13. The method of claim 1, wherein said light signal is polarized with its magnetic field predominantly polarized parallel to the interfaces between said device layers and said gain medium.

14. The method of claim 1, wherein said gain layer has dimensions less than or equal to 50 nm.

\* \* \* \* \*